United States Patent
Rim et al.

[11] Patent Number: 6,154,303
[45] Date of Patent: Nov. 28, 2000

[54] LASER SCANNING SYSTEM

[75] Inventors: Cheon Seog Rim, Seoul; Jong Su Yi, Suwon, both of Rep. of Korea

[73] Assignee: Samsung Electro-Mechanics Co., Ltd., Suwon, Rep. of Korea

[21] Appl. No.: 09/450,057

[22] Filed: Nov. 29, 1999

Related U.S. Application Data

[62] Division of application No. 09/188,939, Nov. 10, 1998.

[30] Foreign Application Priority Data

Jul. 1, 1998 [KR] Rep. of Korea .................. 98-26360

[51] Int. Cl.$^7$ ..................................... G02B 26/08
[52] U.S. Cl. ................. 359/207; 359/205; 359/216; 359/217
[58] Field of Search ................... 359/204–207, 359/216–219, 662, 711, 713–717

[56] References Cited

U.S. PATENT DOCUMENTS

| | | | |
|---|---|---|---|
| 4,639,072 | 1/1987 | Itoh et al. | |
| 5,488,502 | 1/1996 | Saito | 359/205 |
| 5,541,760 | 7/1996 | Lizuka | 359/207 |
| 5,659,532 | 8/1997 | Kamioka et al. | 359/206 |
| 5,715,079 | 2/1998 | Ono | 359/205 |
| 5,838,479 | 11/1998 | Shiraishi | 359/204 |

FOREIGN PATENT DOCUMENTS 4-110817  4/1992  Japan .

*Primary Examiner*—James Phan
*Attorney, Agent, or Firm*—Ladas & Parry

[57] ABSTRACT

A laser scanning system formed by injection molding first and second scanning lenses by using a plastic substance for correcting field curvature at a scanned surface, minimizing focus shift and eccentricity due to a temperature variation and degradation of optical performance due to a tilt error, and providing a relatively simplified lens shape while facilitating mold processing and injection molding includes a light source for emitting a modulated beam from a laser diode, a collimator lens for forming the beam from the light source into parallel beams, a slit for partially passing the parallel beams from the collimator lens, a cylinder lens for converging the parallel beams passed through the slit in a sub scan direction, a polygonal rotating mirror rotated at high speed for deflecting the incident parallel beams at a prescribed angle, and a scanning lens system for receiving the deflected beams from the polygonal rotating mirror to form an image on the scanned surface by converging the incident beams in the scan and sub scan directions, in which a first scanning lens and a second scanning lens of a plastic substance constitute the scanning lens system. A first surface of the first scanning lens is formed with a spherical surface, a second surface of the first scanning lens and third and fourth surfaces of the second scanning lens are formed with an spherical toric surface having a rotating axis in the scan direction. The shape around the optical axis of the scanning lens is concave, convex and concave from the first surface in the scan direction and concave, convex, concave and convex in the sub scan direction.

7 Claims, 7 Drawing Sheets

SCAN DIRECTION

SUB SCAN DIRECTION

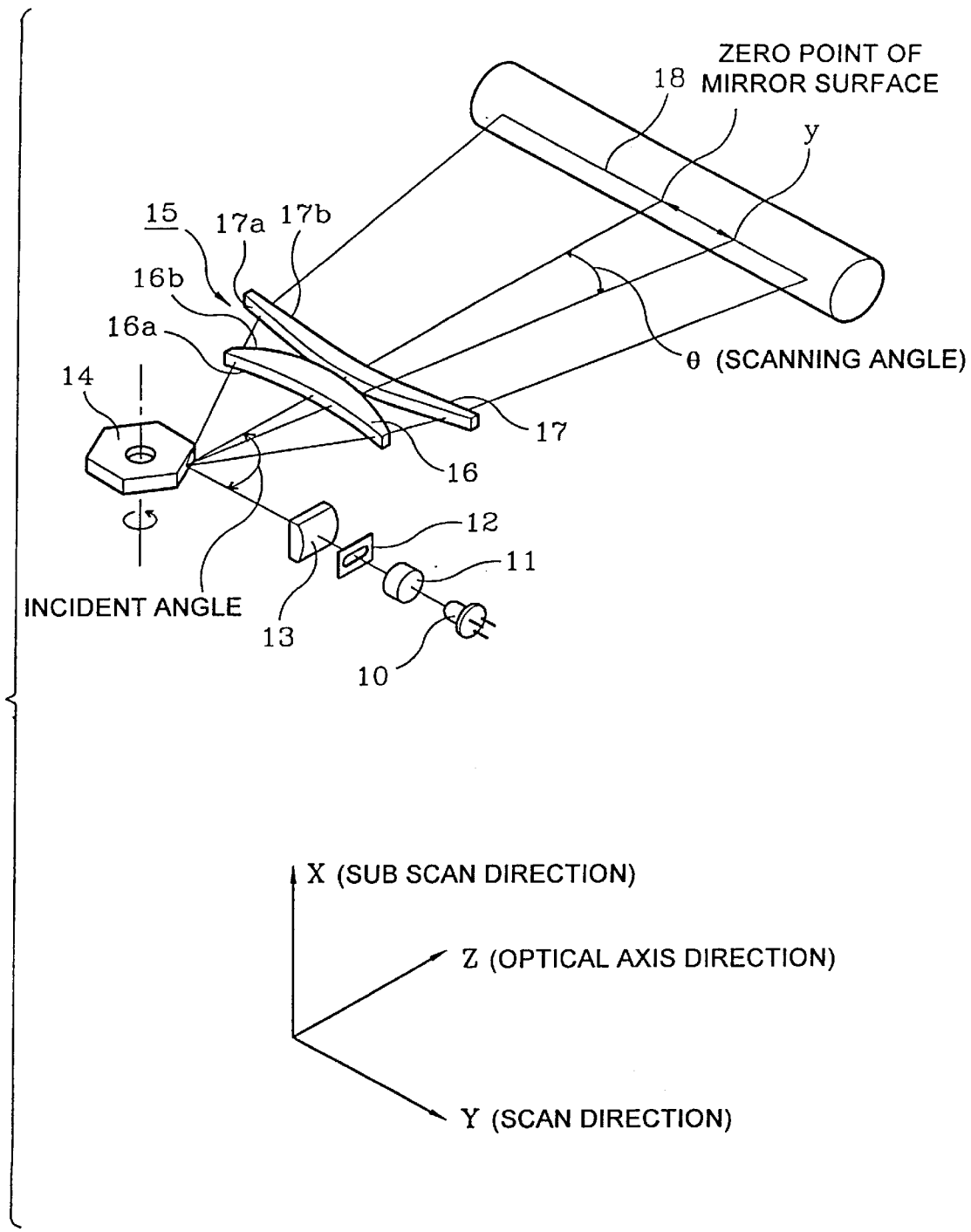
F I G. 2

SCAN DIRECTION

SUB SCAN DIRECTION

LASER SCANNING SYSTEM

This application is a divisional of copending application (s) application number 09/188,939 filed on Nov. 10, 1998.

BACKGROUND OF THE INVENTION

1. Field of the Invention

The present invention relates to a laser scanning system consisting of two plastic lenses to correct field curvature at a scanned surface, minimize focus shift caused by a temperature variation and degradation of optical performance due to a tilt error, and have relatively simplified surface shape facilitating mold processing and injection molding.

2. Description of the Prior Art

A conventional laser scanning system is constructed such that, as shown in FIG. 1, a light-modulated beam from a laser diode 1 is changed into a parallel collimating beam when going through a collimator lens 2 and then passes through a slit 3 elongated in the scan direction. The parallel beam having passed through slit 3 is incident on a cylinder lens 4 which has a refracting power in the sub-scan direction. After going through cylinder lens 4, the beam in the scan direction is incident on a reflecting surface of a polygonal rotating mirror 5 as the parallel beam to be deflected to a scanning lens system 6. Meantime, the beam in the sub-scan direction focuses on the reflecting surface of polygonal rotating mirror 5 to be deflected to scanning lens system 6.

The cylinder lens functions for minimizing inducing positional variation of a spot in the sub-scan direction when the beam forms an image on the scanned surface due to the fact that respective reflecting surfaces of polygonal rotating mirror 5 involve wobble slanted with respect to a rotating axis. Thus, Japanese Patent Publication No. Hei 4-110817 suggested a technique to minimize the influence created by wobble, by providing a toric surface having radii of curvature different from each other in the scan direction and sub scan direction in the scanning lens system to allow the reflecting surfaces of the polygonal rotating mirror and scanned surface 7 to accomplish an optical conjugate point in the subscan direction.

The above Patent Publication No. Hei 4-110817 attains favorable performance in spot size, linearity, etc. However, the overall lens surface consists of the toric surface apt to degrade results due to decenter and tilt error of the scanning lens surfaces.

In U.S. Pat. No. 4,639,072, a cylinder lens is disposed in the vicinity of a scanned surface 7 to inhibit the adverse effect due to the wobble. The scanning lens system satisfies f·θ feature, i.e., $$\left(\frac{y - f \cdot \theta}{y} \times 100\%\right)$$

(refer to FIG. 2) while allowing the beam deflected by the polygonal rotating mirror to form an elliptical spot having its long axis in the sub scan direction at the scanned surface.

However, the above-stated optical conjugate point is not maintained due to the change of the deflecting surface when the polygonal rotating mirror is rotated to cause a phenomenon that an image forming spot in the sub scan direction appears to be asymmetrical right and left across the scanned surface. For this reason, U.S. Pat. No. 5,488,502 suggested a method for minimizing the positional variation of the image forming point of the scanned surface in the sub scan direction by forming a scanning lens adjacent to the scanned surface formed with a deformed cylinder lens whose radius of curvature is asymmetrical right and left in the sub scan direction. Also, in U.S. Pat. No. 5,448,502, a distance from the deflecting surface to scanned surface is shorter than that of the typical optical system, but the distance between lenses becomes greater for the purpose of making the characteristics and field curvature satisfactory to be troublesome in miniaturizing the unit.

Generally, the unit can be miniaturized when a ratio between a focal distance f and length L from the deflection point to the upper plane has a relation that L/f<1.33 or so while maintaining the high optical performance, wide angle of view and excellent f·θ characteristics. Whereas, the aberration is difficult to be corrected as further reaching to both ends rather than the center portion of the scanned surface to induce a problem of forming the spot size to be larger, thereby degrading the performance at both ends of the scanned surface owing to environment change, fabricating the lens and unit arrangement error, etc.

SUMMARY OF THE INVENTION

The present invention is devised to solve the above-enumerated conventional problems. Therefore, it is an object of the present invention to provide a laser scanning system formed by injection molding first and second scanning lenses by using a plastic substance for excellently correcting field curvature at a scanned surface, minimizing focus shift and eccentricity caused by a temperature variation and degradation of optical performance due to a tilt error, and a relatively simplified lens shape while facilitating mold processing and injection molding.

To achieve the above object of the present invention, a laser scanning system is formed by a light source for scanning a light-modulated beam from a laser diode, and a collimator lens for forming the beam scanned from the light source into parallel rays. Also, there is provided a slit for allowing the required parallel beam having passed through the collimator lens to partially pass therethrough, and a cylinder lens for converging the parallel rays having passed through the slit in a sub scan direction. A polygonal rotating mirror is rotated at high speed for deflecting the incident beams parallel in a scan direction and converged in the sub scan direction while going through the cylinder lens in the state of having a prescribed view of angle, and a scanning lens system allows the beams incident after being deflected by the polygonal rotating mirror to form an image on a scanned surface by converging the incident beams in the scan and sub scan directions. Here, the scanning lens system is formed of two pieces of first scanning lens and second scanning lens of a plastic substance, in which a first surface of the first scanning lens is formed of a coaxially aspherical surface (symmetrical aspherical surface) or a spherical surface, a second surface of the first scanning lens and third and fourth surfaces of the second scanning lens are formed of an aspherical toric surface having a rotating axis in the scan direction.

BRIEF DESCRIPTION OF THE DRAWINGS

The above objects and other advantages of the present invention will become more apparent by describing in detail preferred embodiments thereof with reference to the attached drawings in which:

FIG. 2 is a perspective view showing a laser scanning system according to a first embodiment of the present invention;

DETAILED DESCRIPTION OF THE PREFERRED EMBODIMENTS

Figure 1A:
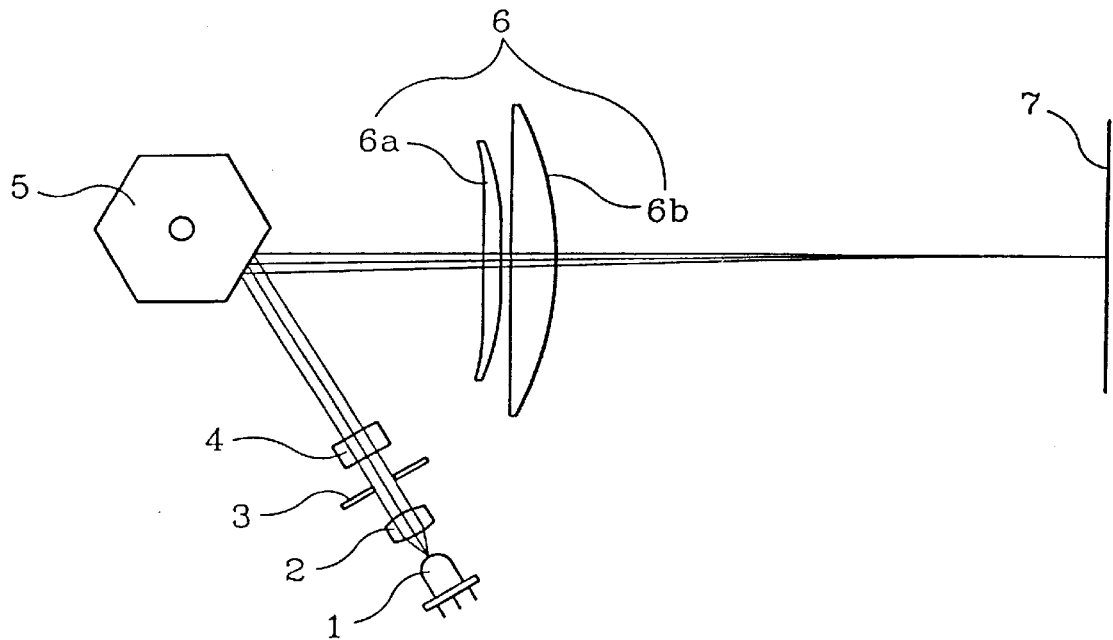
FIGS. 1a and 1b are plan views showing a conventional laser scanning system.
Figure 1B:
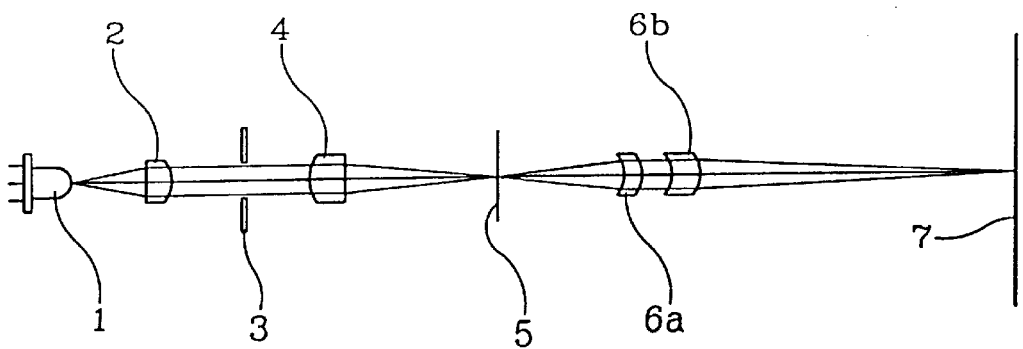
Figure 3A:
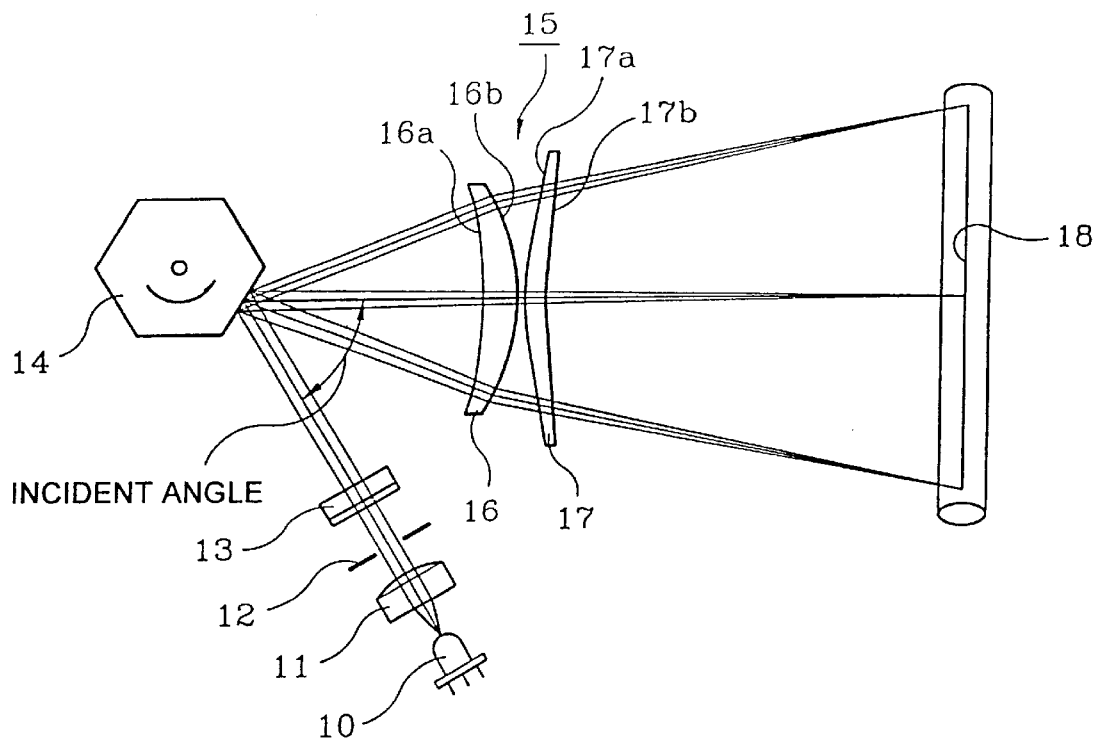
FIGS. 3a and 3b are a plan view and a front view showing the laser scanning system according to the first embodiment of the present invention, respectively.
Figure 3B:
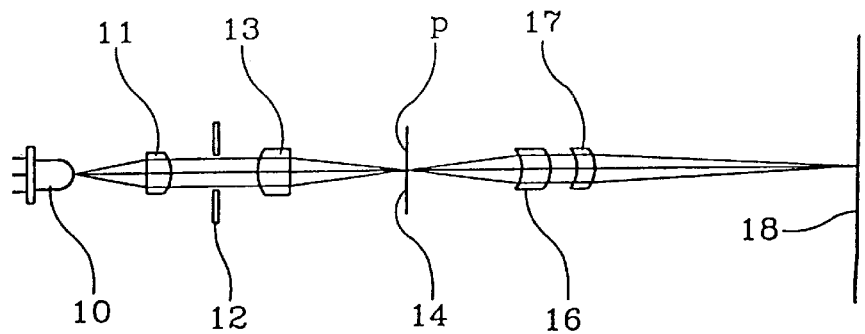
Figure 4:
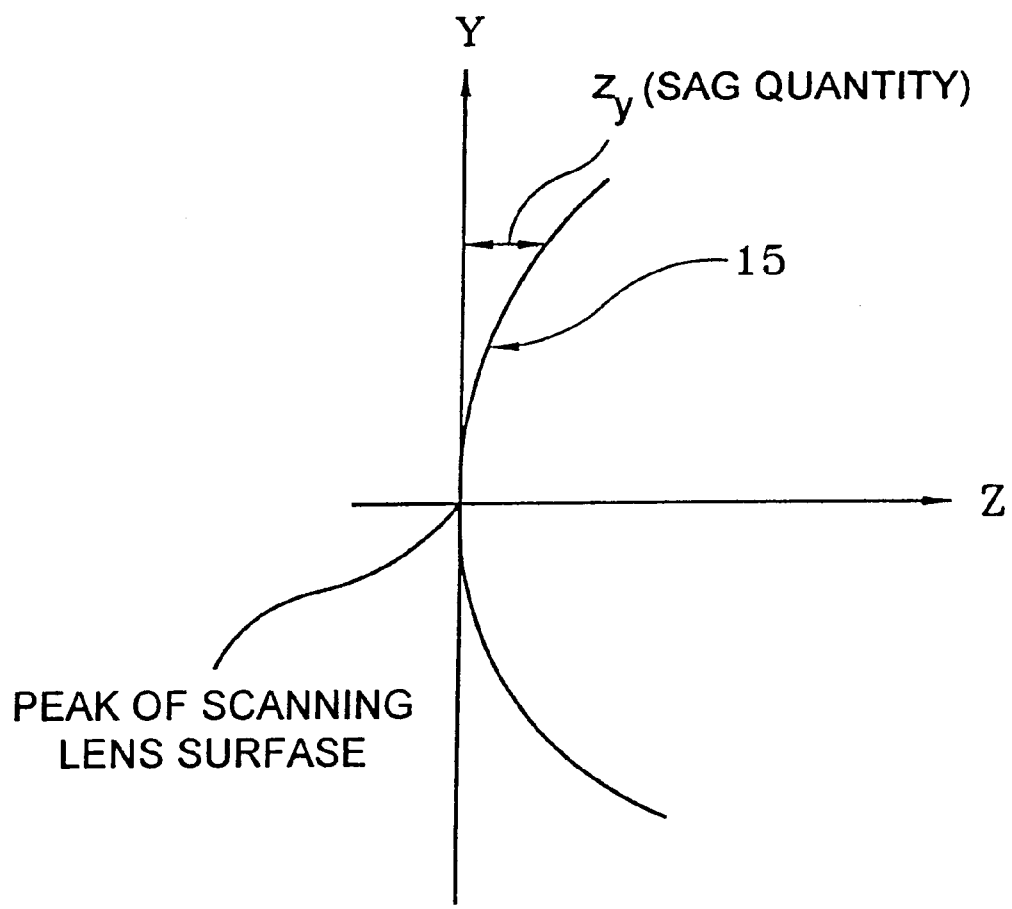
FIG. 4 is a graph representation plotting the distance in the optical axis direction and focal distance of the scanning lens according to the present invention.

FIG. 2 is a perspective view showing a laser scanning system according to a first embodiment of the present invention, and FIGS. 3 and 3b are a plan view and a front view showing the laser scanning system according to the first embodiment of the present invention. Here, a beam radiated from a light source 10 is incident on a polygonal rotating mirror 14 to be parallel in the scan direction and to be converged in the sub scan direction while passing through a collimator lens 11, a slit 12 and a cylindrical lens 13. Then, polygonal rotating mirror 14 deflects the incident beams at the constant angular speed. The deflected beams scan a scanning lens system 15, and then are converged to form a focus on a scanned surface 18. At this time, an optical conjugate point is set between the deflecting point of the above-described polygonal rotating mirror 14 and scanned surface 18 in the sub scan direction, so that the focus shift throughout scanned surface 18 in the sub scan direction becomes minimized even if the reflecting surface of polygonal rotating mirror 14 has wobble with respect to the rotating axis of polygonal rotating mirror 14 in the sub scan direction. Generally, a first scanning lens 16 and a second scanning lens 17 constituting scanning lens system 15 are respectively formed by a plastic lens of low price, which, however, is susceptible to humidity. Furthermore, it has a drawback that the optical performance thereof is greatly lowered owing to the thermal deformation as the refractive capacity gets stronger. To overcome the drawbacks, the present invention utilizes a plastic substance such as zeonex or arton whose thermal characteristic, humidity, birefringence, internal distortion, and so on are improved. The first scanning lens and second scanning lens are shaped as follows.

The surface of scanning lens system 15 is constructed in a manner that a first surface 16a of first scanning lens 16, i.e., the surface facing toward polygonal rotating mirror 14, is of a coaxially aspherical surface (symmetrical aspherical surface) or spherical surface and a second surface 16b is of an aspherical toric surface (Y-toric) having the rotating axis in the scan direction. Also, a third surface 17a and a fourth surface 17b of second scanning lens 17 are formed of the aspherical toric surface (Y-toric) having the rotating axis in the scan direction. The optical axis neighbor of scanning lens system 15 is characterized by being shaped to have a concave portion, a convex portion, a convex portion and a concave portion from first surface 16a in the scan direction, and to have a concave portion, a convex portion, a concave portion and a convex portion from first surface 16a in the sub scan direction. Here, the equation of the shape of the aspherical toric surface is given as:

$$z = \frac{(x^2+y^2)/R}{1+\sqrt{1-(1+k)(x^2+y^2)/R^2}} + A(x^2+y^2)^2 + B(x^2+y^2)^3 + C(x^2+y^2)^4 \quad (1)$$

$$z_y = \frac{y^2/R}{1+\sqrt{1-(1+k)(y/R)^2}} + Ay^4 + By^6 + Cy^8 \quad (2)$$

$$z = \frac{(x^2+z_y^2)/R' + 2z_y}{1+\sqrt{(1-z_y/R')^2 - (x/R')^2}} \quad (3)$$

where equation (1) is of the shape of first surface 16a of the scanning lens system, and equations (2) and (3) are of second surface 16b, third surface 17a and fourth surface 17b of the scanning lens system.

Only that x,y designate optional points in the X,Y axes (refer to FIG. 2), and z of equation (1) is a distance (SAG quantity) of the optical axis direction from an optional point of coaxially aspherical surface (symmetrical aspherical surface) to the XY plane. In equation (3), z designates a distance (SAG quantity) of the optical axis direction from an optional point of the aspherical toric to the XY plane, $Z_y$ is a distance of the optical axis direction from an optional point of the aspherical toric to the Y axis, R is a radius of scan curvature around the optical axis, R' is a radius of sub scan curvature, k is a conic curved surface coefficient, A is a fourth-order aspherical coefficient, B is a sixth-order aspherical coefficient, and C is an eighth-order aspherical coefficient. Here, equation (1) denotes the spherical surface when K=A=B=C=0.

Assuming that the focal distances in the scan direction of the first scanning lens and second scanning lens are respectively designated by f1 and f2, the present invention satisfies the condition that 0.3<|f1/f2|<0.5.

Additionally, when the focal distances in the sub scan direction of the first scanning lens and second scanning lens are respectively designated by f1' and f2', the condition that 1.0<|f1'/f2'|<2.0 is satisfied.

When the focal distance in the scan direction of the first scanning lens in the scanning optical system is designated by f1, and the focal distance in the sub scan direction is designated by f1', the condition that 1.8<|f1/f1'|<2.8 is satisfied.

Also, when the focal distance in the scan direction of the second scanning lens in the scanning optical system is designated by f2, and the focal distance in the sub scan direction is designated by f2', the condition that 7.5<|f2/f2'|<10.5 is satisfied.

In view of the scanning lens system constructed as above, the f·θ characteristics and field curvature of the scanned surface are excellently corrected at the wide angle of view, and the degradation of the optical performance at the scanned surface resulting from the eccentricity and tilt error at the scanning lens surface or between scanning lenses are minimized. At this time, since all aspherical toric surfaces use the scan direction as the rotating axis, it is easy to process the molding of precise shape and the shape of plane is relatively simple to be easy to perform the injection molding. Furthermore, the focus shift incited by the temperature variation can be minimized by means of the appropriate refractive capacity distribution (inverse number of the focal distance) between scanning lenses.

The designing data of the first embodiment of the present invention is provided as below.

| Lens | No. of Surfaces | Radius of Curvature of Scan | Radius of Curvature of Sub Scan | Thickness (D) | Refractive Index (N) |
|---|---|---|---|---|---|
| Cylinder Lens | 1st S. | ∞ | 18.18 | 4.00 | 1.511049 |
| | 2nd S. | ∞ | ∞ | 33.50 | — |
| Polygonal rotating mirror | Deflecting S. | — | — | 32.34 | reflection |
| Scanning Lens | 1st S. | −176.47 | −176.47 | 12.00 | 1.52382 |
| | 2nd S. | −66.95 | −34.17 | 4.05 | — |
| | 3rd S. | 99.21 | −27.79 | 8.00 | 1.52382 |
| | 4th S. | 166.66 | −15.77 | 128.66 | — |

Scanning Lens

1st Surface: k=17.49, A=9.564E-07, B=−1.251E-09, C=4.514E-13
2nd Surface: k=1.38, A=8.162E-07, B=−5.404E-10, C=9.309E-14
3rd Surface: k=0.53, A=−1.985E-06, B=4.159E-10, C=−4,135E-14
4th Surface: k=−4.37, A=−1.354E-06, B=2.826E-10, C=−1,956E-14

In the first embodiment of the present invention, the applied wavelength of the light source is 786.5 nm, and the incident angle of the polygonal rotating mirror is 80.0° (refer to FIG. 2). Additionally, the maximum scanning angle (θ) of the polygonal rotating mirror is ±45°, the focal distance f of the scanning lens is 136.0 mm, and the distance from a deflecting point p of the polygonal rotating mirror to the scanned surface is 185.0 mm (see FIG. 3b). Besides, the polygonal rotating mirror is of 6 surfaces, the diameter of the inscribed circle thereof is φ34.64 mm, and the dimension of the slit is 2.6 (scan direction)×1.5 (sub scan direction).

Providing that the focal distances of the first scanning lens and second scanning lens in the scan direction are respectively designated by f1 and f2, f1/f2=0.44. When the focal distances of the first scanning lens and second scanning lens in the sub scan direction are respectively designated by f1' and f2', f1'/f2'=1.39, f1/f1'=2.52 and f2/f2'=7.94. The field curvature and f·θ feature $$\left( \frac{y - f \cdot \theta}{y} \times 100\% \right)$$

Figure 5:
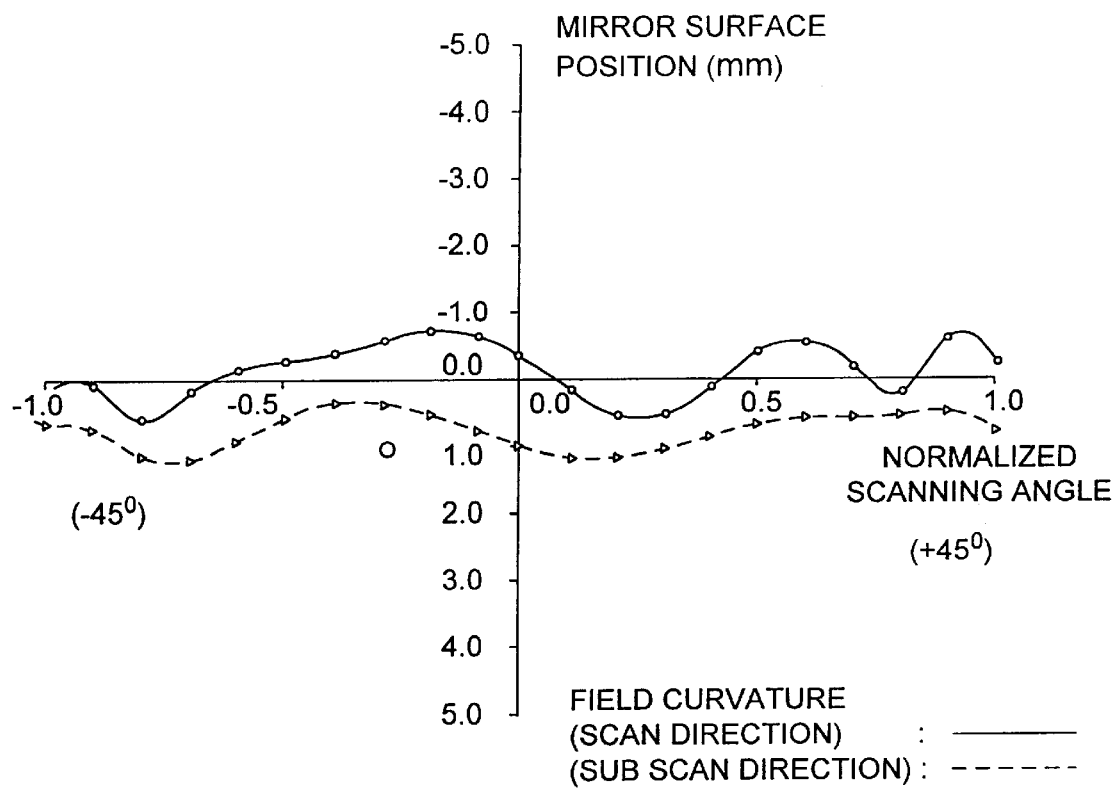
FIG. 5 shows the field curvature of the scanning and sub scanning of the first embodiment.
Figure 6:
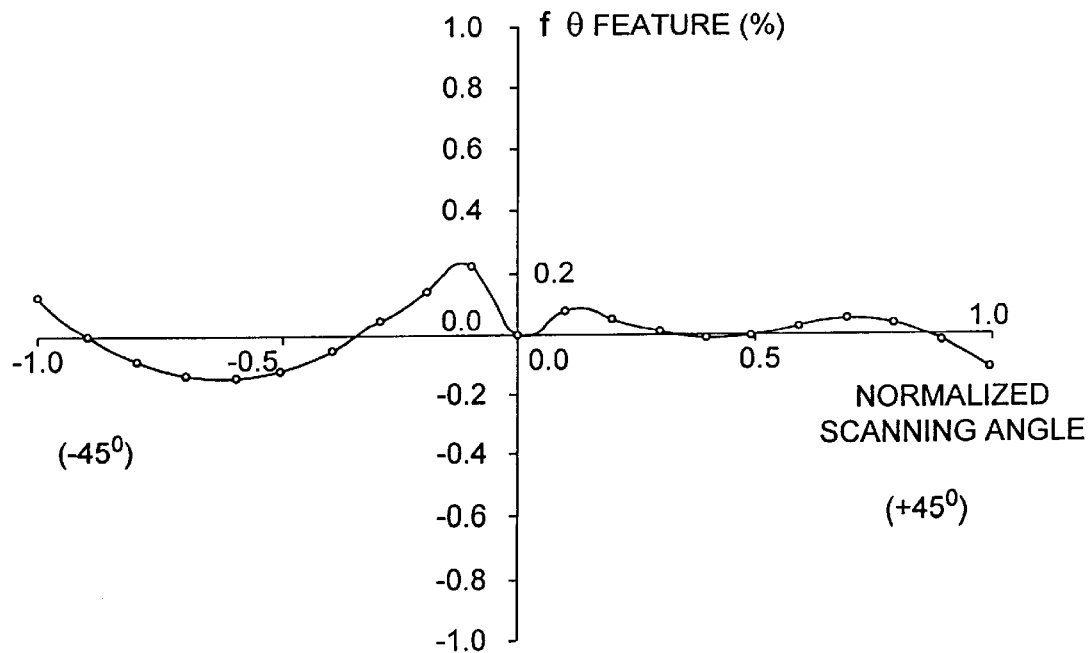
FIG. 6 shows the f·θ characteristics of the scanning lens according to the first embodiment.

(refer to FIG. 2) presented by the first embodiment of the present invention are provided as shown in FIGS. 5 and 6.

Figure 7A:
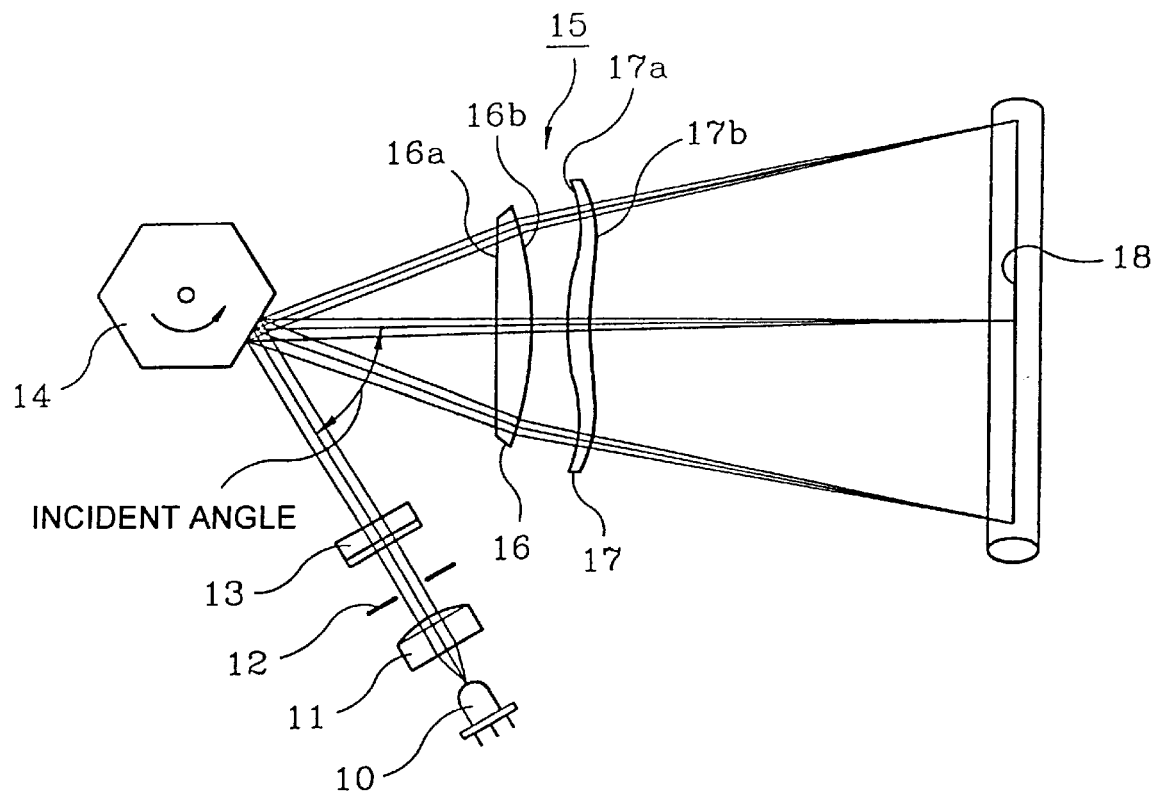
FIGS. 7a and 7b are a plan view and a front view showing the laser scanning system according to a second embodiment of the present invention, respectively.
Figure 7B:
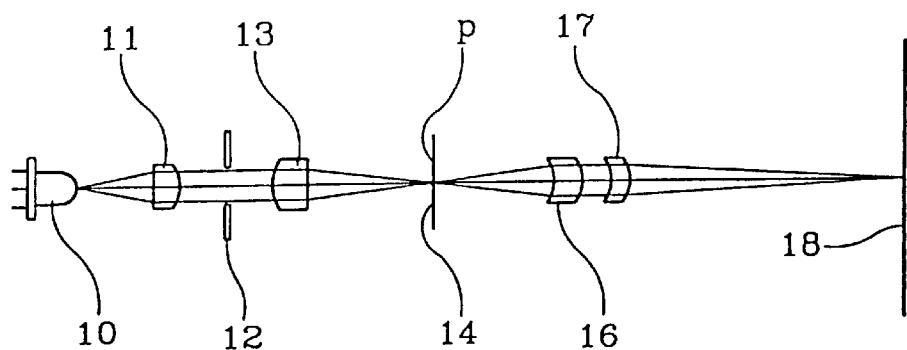

FIGS. 7a and 7b are a plan view and a front view of the laser scanning system according to a second embodiment of the present invention, respectively, whose designing data is written as follows.

| Lens | No. of Surfaces | Radius of Curvature of Scan | Radius of Curvature of Sub Scan | Thickness (D) | Refractive Index (N) |
|---|---|---|---|---|---|
| Cylinder Lens | 1st S. | ∞ | 17.96 | 4.00 | 1.511049 |
| | 2nd S. | ∞ | ∞ | 33.50 | — |
| Polygonal rotating mirror | Deflecting S. | — | — | 29.93 | reflection |
| Scanning Lens | 1st S. | −308.20 | −308.20 | 12.00 | 1.52382 |
| | 2nd S. | −73.72 | −41.27 | 20.07 | — |
| | 3rd S. | 92.74 | −124.96 | 9.74 | 1.52382 |
| | 4th S. | 134.66 | −23.12 | 113.25 | — |

| Lens | No. of Surfaces | Radius of Curvature of Scan | Radius of Curvature of Sub Scan | Thickness (D) | Refractive Index (N) |
|---|---|---|---|---|---|
| Scanning Lens | | | | | |
| 1st Surface: K=0, | A=0, | B = 0, | C=0 | | |
| 2nd Surface: K=0.48, | A=−9.307E-09, | B=−3.051E-10, | C=1.232E-13 | | |
| 3rd Surface: K=0.57, | A=−1.521E-06, | B=2.360E-10, | C=−5,853E-14 | | |
| 4th Surface: K=0.00, | A=−1.105E-06, | B=2.067E-10, | C=−4,536E-14 | | |

In the second embodiment of the present invention, the applied wavelength of the light source is 786.5 nm, and the incident angle of the polygonal rotating mirror is 80.0° (refer to FIG. 2). Additionally, the maximum scanning angle (θ) of the polygonal rotating mirror is ±45°, the focal distance f of the scanning lens is 136.0 mm, and the distance from a deflecting point p of the polygonal rotating mirror to the scanned surface is 185.0 mm (see FIG. 3b). Besides, the polygonal rotating mirror is of 6 surfaces, the diameter of the inscribed circle thereof is φ34.64 mm, and the dimension of the slit is 2.6 (scan direction)×1.5 (sub scan direction).

Providing that the focal distances of the first scanning lens and second scanning lens in the scan direction are respectively designated by f1 and f2, f1/f2=0.35. When the focal distances of the first scanning lens and second scanning lens in the sub scan direction are respectively designated by f1' and f2', f1'/f2'=1.71, f1/f1'=2.03 and f2/f2'=10.04.

The field curvature and f·θ characteristics $$\left( \frac{y - f \cdot \theta}{y} \times 100\% \right)$$

Figure 8:
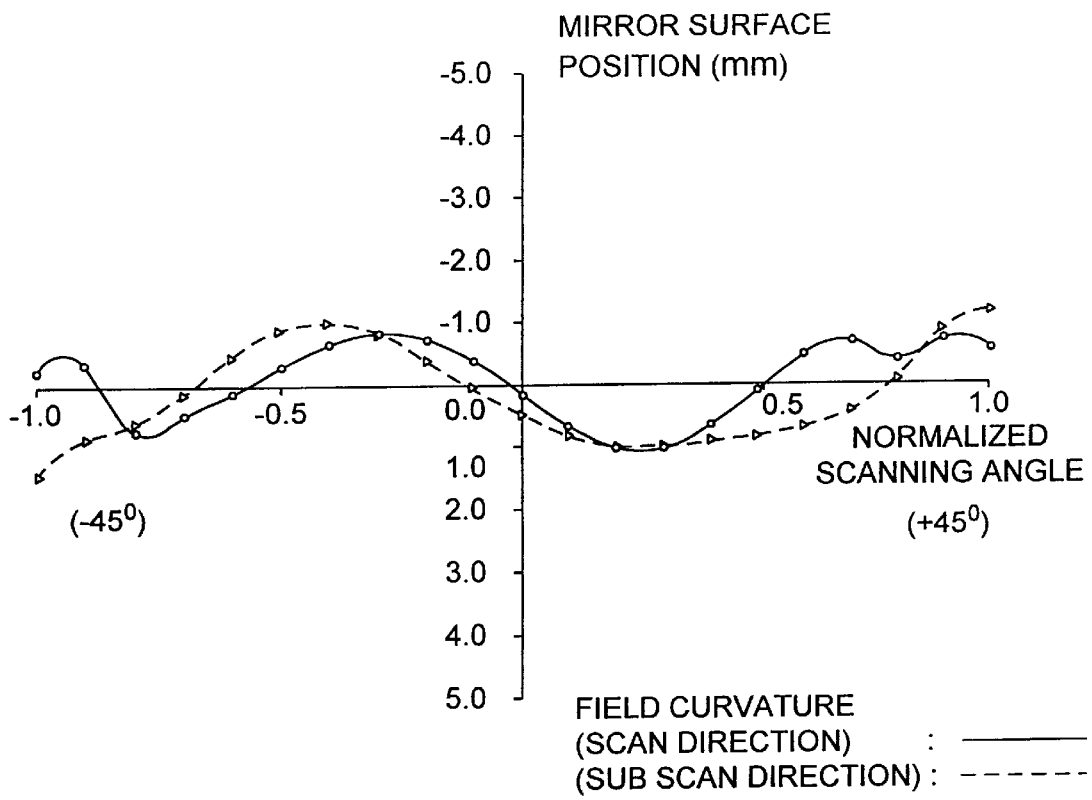
FIG. 8 shows the field curvature of the scanning and sub scanning of the second embodiment.
Figure 9:
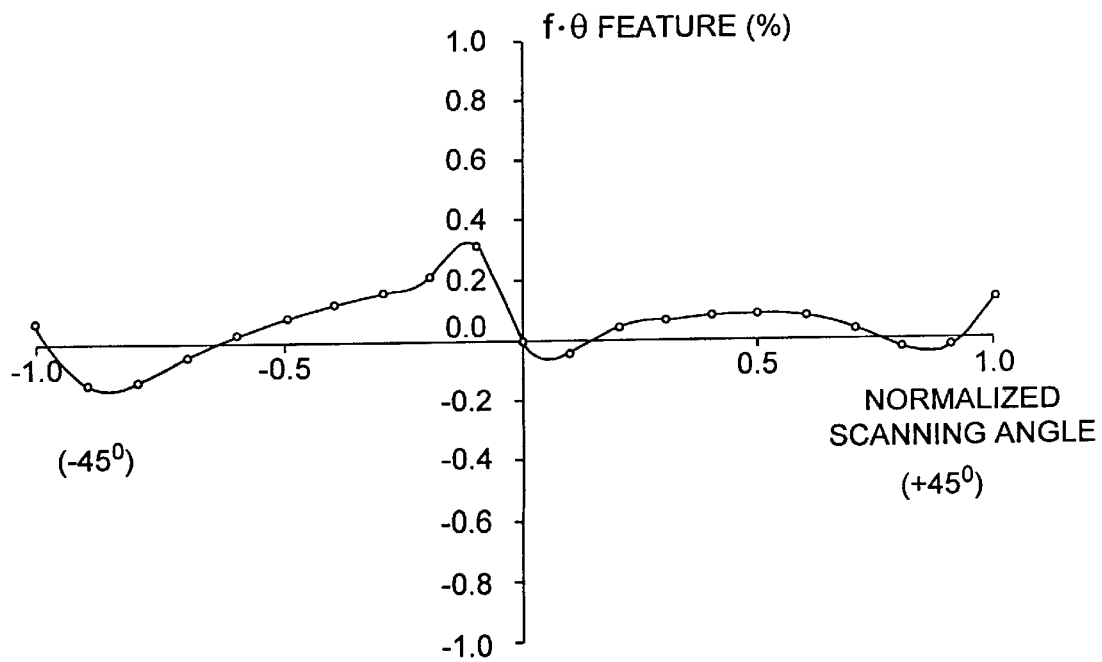
FIG. 9 shows the f·θ characteristics of the scanning lens according to the second embodiment of the present invention.

(refer to FIG. 2) presented by the second embodiment of the present invention are provided as shown in FIGS. 8 and 9.

In accordance with the first and second embodiments of the present invention, first surface 16a of first scanning lens 16 facing toward polygonal rotating mirror 14 is shaped to be concave in the scan and sub scan directions, and second surface 16b is shaped to be convex in the scan and sub scan directions. Third surface 17a of second scanning lens 17 facing toward scanned surface 18 is shaped to be convex in the scan direction and concave in the sub scan direction, and fourth surface 17b is shaped to be concave in the scan direction and convex in the sub scan direction.

By applying the scanning lens system of the present invention to image forming apparatuses such as a laser beam printer as described above in detail, the degradation of the optical performance caused by the temperature variation, errors in fabricating the lens, assembling errors in the unit, etc. can be minimized while the mold and injection molding are relatively facilitated to make it possible to carry out the mass production of lenses of low price.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A laser scanning system comprising:
   a light source for emitting a light-modulated beam from a laser diode;
   a collimator lens for forming the beam emitted from said light source into parallel beams;

a slit for allowing the parallel beams having passed through said collimator lens to partially pass therethrough;

a cylinder lens for converging said parallel beams having passed through said slit in a sub scan direction;

a polygonal rotating mirror rotated at high speed for allowing the parallel beams from said cylinder lens to deflect at a prescribed angle; and a scanning lens system for receiving the parallel beams after being deflected by said polygonal rotating mirror to form an image on a scanned surface by converging the parallel beams in scan and sub scan directions, said scanning lens system comprising a first scanning lens and a second scanning lens made of a plastic substance wherein a first surface of said first scanning lens is a spherical surface, a second surface of said first scanning lens and third and fourth surfaces of said second scanning lens are formed of an aspherical toric surface having a rotating axis in said scan direction.

2. A laser scanning system as claimed in claim 1, wherein the shape around the optical axis of said scanning lens is provided by a concave portion, a convex portion, a convex portion and a concave portion from said first surface in said scan direction.

3. A laser scanning system as claimed in claim 1, wherein the shape around the optical axis of said scanning lens is provided by a concave portion, a convex portion, a concave portion and a convex portion from said first surface in said sub scan direction.

4. A laser scanning system as claimed in claim 1, satisfying a condition that $$0.3 < |f1/f2| < 0.5$$

where, in said scanning lens system, focal distances of said first scanning lens and said second scanning lens in said scan direction are respectively designated by f1 and f2.

5. A laser scanning device as claimed in claim 1, satisfying a condition that $$1.0 < |f1'/f2'| < 2.0$$

where, in said scanning lens system, the focal distances of said first scanning lens and said second scanning lens in said sub scan direction are respectively designated by f1' and f2'.

6. A laser scanning system as claimed in claim 1, satisfying a condition that $$1.8 < |f1/f1'| < 2.8$$

where, in said scanning lens system, focal distance in said scan direction of said first scanning lens is designated by f1 and in said sub scan direction is designated by f1'.

7. A laser scanning system as claimed in claim 1, satisfying a condition that $$7.5 < |f2/f2'| < 10.5$$

where, in said scanning lens system, focal distance in said scan direction of said second scanning lens is designated by f2 and in said sub scan direction is designated by f2'.

* * * * *